United States Patent [19]

Kesselman

[11] 4,225,165

[45] Sep. 30, 1980

[54] TAMPER-RESISTANT FASTENER FOR UTILITY METERS

[76] Inventor: David A. Kesselman, 1183 Elm Ave., Sonoma, Calif. 95476

[21] Appl. No.: 50,098

[22] Filed: Jun. 19, 1979

[51] Int. Cl.³ ............................................. E05C 13/02
[52] U.S. Cl. ................................... 292/256.67; 85/61
[58] Field of Search .................. 292/256.67, 251, 307; 85/61

[56] References Cited

U.S. PATENT DOCUMENTS

| | | | |
|---|---|---|---|
| 3,259,414 | 7/1966 | Rothert | 292/256.67 |
| 4,037,515 | 7/1977 | Kesselman | 85/61 |
| 4,076,291 | 2/1978 | Pope et al. | 292/256.67 |

Primary Examiner—Richard E. Moore
Attorney, Agent, or Firm—Shoemaker and Mattare, Ltd.

[57] ABSTRACT

A tamper-resistant fastener for use on utility meter collars. The fastener is used with standard utility meter equipment and prevents significant rotation of a collar takeup ring screw in either the threading or unthreading direction. Once one form of the tamper-resistant fastener is in place, the meter collar can only be removed by authorized personnel. In another form of the fastener, removal is apparent.

15 Claims, 5 Drawing Figures

TAMPER-RESISTANT FASTENER FOR UTILITY METERS

BACKGROUND OF THE INVENTION

The present invention relates in general to electric meters, and, more particularly, to fasteners used on electric meters.

Electric meter tampering and current diversion has become a billion dollar problem for utilities. Although so-called "high security" type meter rings are available, these rings have proved expensive and difficult to control. All presently known designs of utility meters utilize key locks for controlling entry; however, such designs have many problems inherent therein.

As such, there is a need for a means to tamper proof utility company meters in an economical manner that does not require key control, proves unauthorized entry, yet will enable a utility company to utilize the many millions of conventional meter rings that are presently installed. It is also noted than any means accomplishing the just-described results should also require only a minimum of reeducation for utility company meter installers, and the like.

SUMMARY OF THE INVENTION

The fastener embodying the teachings of the present invention provides an easily installed tamper-resistant feature to presently existing electric utility meters.

The device utilizes a fastener similar in configuration to the fastener disclosed in the inventor's patent, U.S. Pat. No. 4,037,515. The disclosure of this patent is, therefore, fully incorporated into the present disclosure by reference thereto.

The presently disclosed fastener is mounted in the head section of a ring screw and the collar block in which the ring screw is mounted has a chamber defined therein in which the head-mounted fastener is accommodated. The fastener abuts the chamber walls to prevent turning of the ring screw when the fastener is in place.

The fastener includes a bipartite nut which has a stud engaging portion on a threaded stud which is threadably received in an internally threaded bore defined in the ring screw and a gripping member engaging portion connected to the stud engaging portion by a frangible neck portion. The frangible neck includes a break joint which permits the gripping member engaging portion to be removed after a predetermined amount of torque is applied to the bore received fastener. Thus, once tightened down, the head shears off.

A slip ring surrounds the stud engaging portion and, in one embodiment, prevents grasping that stud engaging portion with sufficient force to permit the fastener stud from being removed from the ring screw head. In another embodiment, the slip ring is formed of a crushable material that readily identifies removal.

Thus, once in place, the fastener prevents unauthorized undetected rotation of the ring screw in a manner which would remove that screw from the collar takeup means, and thus the fastener prevents unauthorized undetected removal of the utility ring collar. The meter ring thus cannot be removed by loosening the ring screw without first breaking the fastener.

The slip ring, or protective collar, is shaped to fit into the collar block housing, or the fastener chamber, snugly, yet will remain freely turnable. This design, in one form of the invention, further offers additional strength against crushing by a wrench.

Only special tools can be used to remove the first form of the in-place fastener. Thus, willful intent can be easily proved, especially when a ring seal usually found on all meters is broken. The special removal tools required to break the slip ring will be possessed only by authorized personnel. In the second form of the invention, the soft slip ring is crushed during removal which, of course, readily shows removal.

The device of the present invention costs considerably less than present alterations, and no key control is necessary. Furthermore, the presently disclosed device permits tighter grouping of meters, which result cannot be accomplished using presently known high security type meters.

The presently available meter ring screws and collar takeup means can be easily modified to accommodate the presently disclosed fastener, and thus, the presently installed equipment can be used. This feature represents a considerable cost advantage for the presently described device.

Furthermore, no special skills or the like will be required to install and service meters using the present device. Thus, only a minimum of re-education of installers, and the like, is required.

OBJECTS OF THE INVENTION

It is, therefore, a main object of the present invention to provide a tamper-resistant feature to a standard utility meter screw ring.

It is another object of the present invention to provide a tamper-resistant feature to a standard utility meter screw ring which does not require key control.

It is yet another object of the present invention to provide a tamper-proof feature to a standard utility meter screw ring which proves unauthorized entry.

It is still another object of the present invention to provide a tamper-resistant feature to a standard utility meter screw ring which enables the utility company to utilize presently installed meter rings.

It is a further object of the present invention to provide a tamper-resistant feature to a standard utility meter screw ring which only requires a minimum of re-education of meter installers.

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
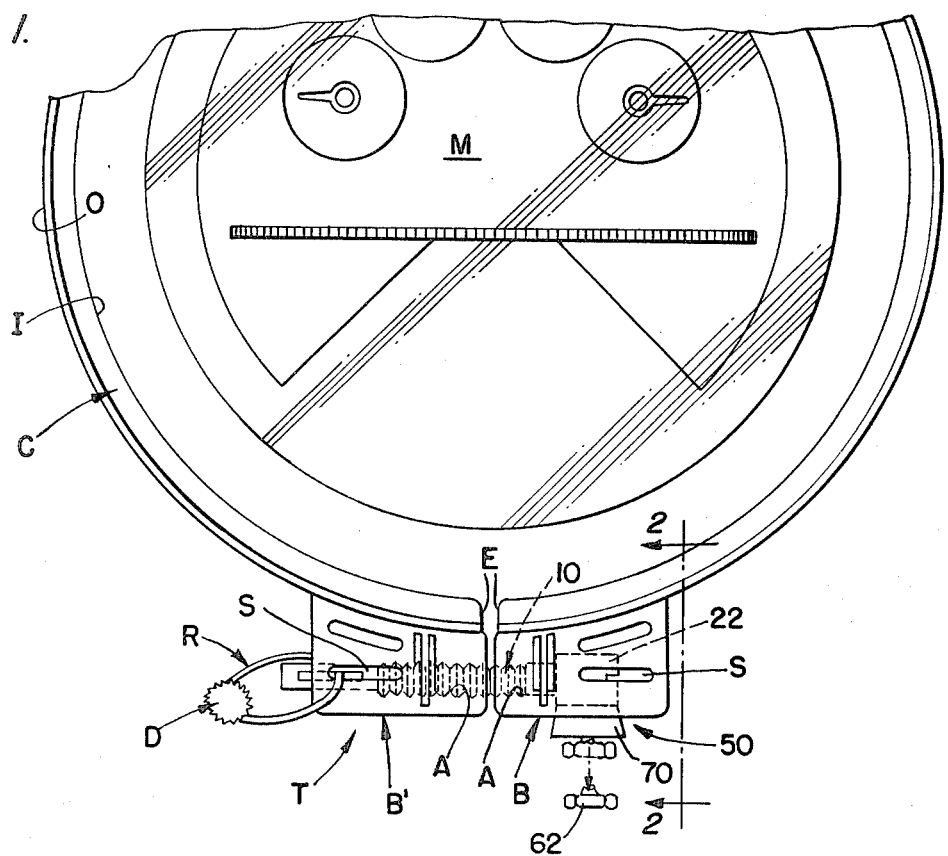
FIG. 1 is a plan view of an electric meter with a meter ring bound together with a takeup means utilizing the fastener embodying the teachings of the present invention.

Shown in FIG. 1 is a meter M, such as an electric meter, or the like. The meter is circumscribed by an annular collar C having the inner periphery I thereof securely seated about the outer periphery of the meter. The collar has an outer periphery O and a pair of facially opposed ends E which are drawn together to secure the collar about the meter as is known to those skilled in the meter art.

A ring draw, or takeup means, T is mounted on the collar outer peripheral surface near the ends E of that collar. The takeup means includes a pair of mounting blocks B and B' each having an internally threaded bore A which is aligned with the bore of the other block.

Figure 3:
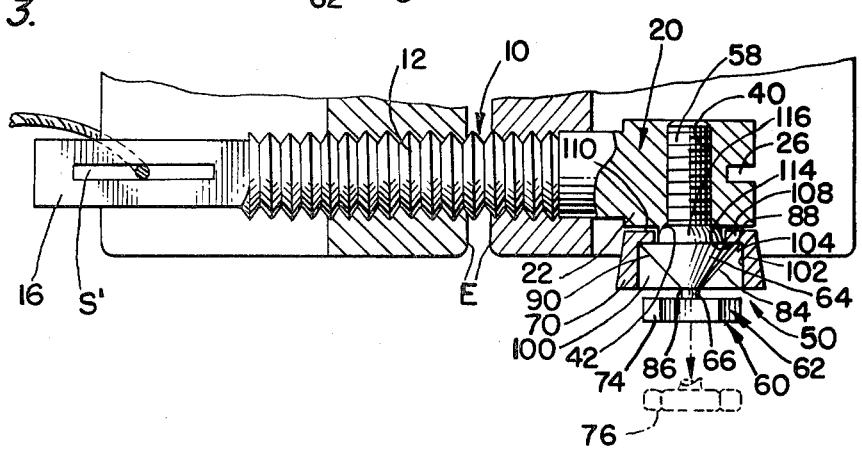
FIG. 3 is a view taken along line 3—3 of FIG. 2.

A ring screw 10 has an externally threaded shank 12 with an elongate planar tongue 16 integrally mounted on one end of the shank and a screw head section 20 integrally mounted on the other end of the shank. The ring screw includes a head section 22, and as shown in FIGS. 1 and 3, the head section 22 of the ring screw is slightly larger than the head section on a standard ring screw presently used by utility companies. However, the presently used screws can be easily modified to include the enlarged head by machining, or the like. The head section 20 also includes a slot 26 which receives the blade of a screwdriver to threadably mount the screw 10 into the aligned bores A of the blocks and thereby attach the blocks together. The screw 10 is rotated until the desired degree of takeup has been established.

Each of the blocks has an elongate slot S defined therein, and the ring screw tongue 16 has an elongate slot S' defined therein. The slots S and S' are aligned when the ring screw is appropriately accommodated in the blocks B and B', and a seal ring R is received through the aligned slots. A seal bead D is placed on the seal ring to indicate opening of the ring.

Figure 2:
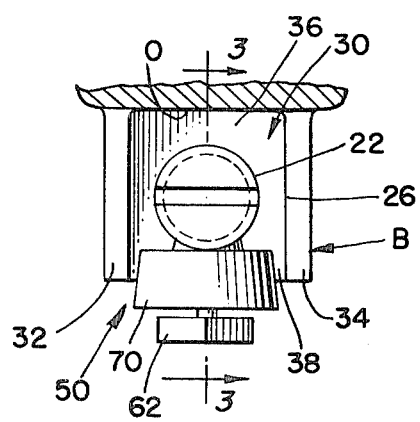
FIG. 2 is a view taken along line 2—2 of FIG. 1.

As best shown in FIGS. 1 and 2, the takeup block B has a screw head accommodating chamber 30 defined therein to be disposed radially outward of the meter collar C. The chamber is defined by walls 32, 34 and 36, as well as the ring outer peripheral surface O. One end of the chamber is open so a screwdriver can be inserted thereinto to engage and drive the ring screw 10. Furthermore, the side of the chamber opposite the collar, denoted by the reference indicator 38 in FIG. 2, is open for a purpose to be later discussed.

As best shown in FIG. 3, the screw head 22 has a transverse bore 40 defined therethrough which extends completely through the head in a direction transverse of the shank, or at essentially right angles thereto. The bore longitudinal axis lies in the plane which is parallel to, or in, a plane containing the planar ring screw tongue 16 so that when the tongue slot S' is aligned with block slots S to receive the seal ring R as shown in FIGS. 1 and 3, the bore 40 will be oriented with the longitudinal axis thereof extending radially outward of the collar away from the collar C. The bore 40 is internally threaded, and has chamfered sections 42 machined therearound to facilitate seating security for the device. Preferably, the bore is located centrally of the longitudinal direction of the head 22.

A tamper-resistant fastener 50 is mounted on the screw head 22 and prevents rotation of the ring screw once that screw is placed in the collar takeup position shown in FIG. 1. By using the fastener 50, unauthorized separation of the blocks B and B', and hence unauthorized opening of the collar C, is resisted.

The fastener 50 comprises a male fastener which is shown in the Figures to be an externally threaded stud 58 fitted into the transverse bore 40. The fastener 50 includes a bipartite nut 60 having a wrench engaging portion 62 and a stud engaging portion 64 interconnected by a frangible neck portion 66 which forms a break joint between portions 62 and 64. The stud engaging portion is frusto-conically shaped with the base of the cone attached to the top of the threaded stud. The break joint is on the end of the portion remote from the base.

Encircling the stud engaging portion of the bipartite nut is an escutcheon formed by a freely rotating slip ring 70 which forms a protective sleeve which will be interposed between a gripping instrument and the stud engaging portion 64, as will be later explained.

The gripping member engaging portion 62 is best shown in FIG. 3, and comprises a plurality of facets 74 and a free top surface 76. The gripping member engaging portion is adapted to be engaged by a wrenching or gripping instrument, such as a crescent wrench, or the like, to turn the bipartite nut.

The stud engaging portion is unitary with the stud 58 coaxial therewith and has a top surface 84 presented outwardly with respect to the screw head 22. The top surface 84 is frusto-conical in shape with a top rim 86 adjacent the nut portion 62 and a bottom rim 88 connected to the top rim by a sloping surface 90. Preferably, the stud engaging portion 64 is formed of case hardened steel, or the like.

The break joint formed by the frangible neck portion 66 is best shown in FIG. 3. The break joint is formed by a reduced thickness metal at the neck portion and is adapted to shear apart or rupture upon the application of a predetermined amount of torque between the stud engaging portion 64 and the gripping member engaging portion 66, as by a wrench, so that the stud and gripping member engaging portions are separated. This torque is any suitable value. Thus, the fastener 50 can be arranged to be inserted into the ring screw with a predetermined amount of torque.

The slip ring 70 is best shown in FIG. 3 and is essentially cylindrical in shape, with a central bore 100 defined therein by inner face 102 thereof for receiving the stud engaging portion 64. The inner diameter of the slip ring slightly exceeds the outer diameter of the base of portion 64, so that there is defined a slip gap 104. The slip gap enables the slip ring to rotate freely about the portion 64 to prevent a gripping member from engaging, and hence gripping, the portion 64.

The ring 70 has an axial movement preventing locking means thereon comprising a slip flange 108 with a slip surface 110 on the lower end thereof for slipping on the outer surface of the screw head 22. The slip flange 108 prevents movement of the ring 70 in the axial direction of the stud 58, and thus prevents removal of the ring 70 from the portion 64. The flange 108 has an upper face 114 adapted to engage the undersurface of the stud engaging portion. The slip flange is sized to permit the ring 70 to rotate freely, and a spacing boss 116 is located on top of the stud and integrally connects the stud and stud engaging portion to ensure free rotation of the slip ring. In one embodiment of the present invention, the ring will be formed of a material having sufficient strength so that the ring cannot be crushed against the portion 64 sufficiently to allow the portion 64 to be turned through frictional engagement with the inner surface 102 of the ring 70. Thus, depending upon the mechanical properties of the ring, the thickness thereof will be adjusted to provide the aforementioned protection against gripping the portion 64 with sufficient force to allow that portion to be turned, and thus the fastener separated from the ring screw 10.

In another embodiment of the present invention, the slip ring 70 will be formed of a material which can be deformed, or crushed, by a device such as vise grip pliers, or the like. Materials such as aluminum, or the like, are suitable for this embodiment. In order to remove the device 10, the vise grip completely crushes and destroys the soft slip ring and permits the detection of tampering. Although the soft slip ring provides security against most type of wrenches, the soft material can permit the vise grip to back out the screw. However, the most important feature of this embodiment is the proving of unauthorized tampering, which the soft slip ring does. Once the soft slip ring has been tampered with, the only way to replace the device is to back out the screw and then obtain a new assembly, which will only be available from an authorized source.

Furthermore, the gap 104 is large enough to permit free rotation of the ring 70 about portion 64, but small enough to prevent the insertion of a jamming device, or disengaging device, or even an adhesive, into gap 104 so that the ring 70 and the portion 64 can be rotated together.

The ring 70 extends above the surface 84 of the portion 64 and has a top rim located above the top edge of the portion 64 to prevent gripping that edge with sufficient force to rotate the fastener with respect to the head of the ring screw. Thus, the sloping surface 84 prevents the grasping of the portion 64 by any instrument with enough force to enable separation of the fastener from the ring screw.

Thus, as can be seen in FIGS. 1 and 3, the stud 58 is advanced into the bore 40 by gripping portion 62 with a device, such as a wrench, or the like. Once the stud is fully taken up into the bore 40, the undersurface of the flange 108 is located adjacent the outer surface of the screw head 22, the slip flange 108 of the ring 70 is located in a manner which virtually prevents the gripping of the stud engaging portion with sufficient force to enable it to be backed out of the bore 40. Further torquing of the gripping engaging portion 62 will place a shear stress on the neck portion 66. Once that shear stress exceeds the predetermined value, the neck separates and frees the gripping member engaging portion from the stud engaging portion, leaving the stud firmly engaged in the bore 40.

The hard slip ring therefore essentially prevents the release of the fastener from the position thereof shown in the Figures. The soft slip ring, of course, proves removal. The only way that the fastener can be removed is by first removing the ring 70, which, in the case of the hard slip ring, may be formed of either hardened or other materials. Thus, once the hard slip ring device 50 is in place and separated into the operative form, the device is essentially permanently positioned in the head 22, and the takeup means is vitually tamperproof.

When the fastener 50 is in place, the ring screw cannot be rotated enough to either tighten or loosen the collar C as the fastener, in particular the slip ring 70, will contact the walls 32 or 34 of the chamber 30, thereby preventing rotation of the ring screw in a manner which either threads or unthreads that screw in the aligned bores of the collar blocks.

In order to remove the collar C, the fastener 50 must be removed. Removal of the hard slip ring fastener 50 can only be accomplished using special tools, which will be possessed only by those authorized to remove the collar.

Figure 4:
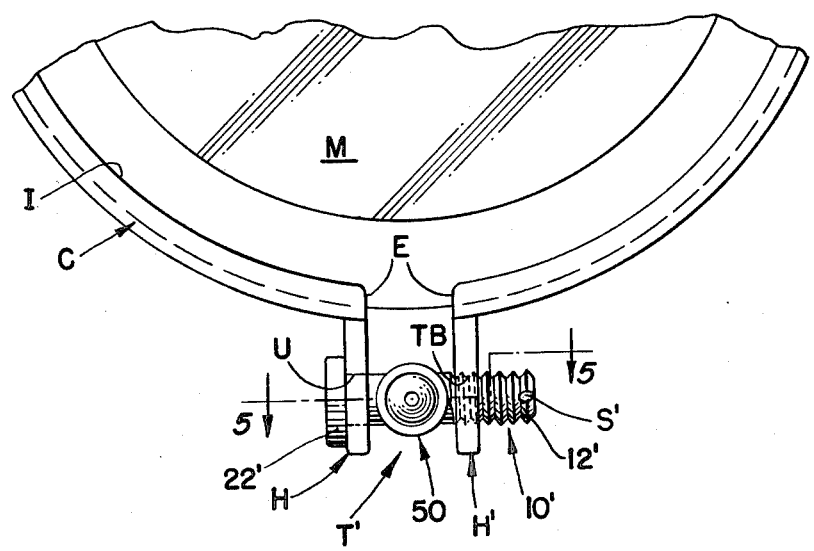
FIG. 4 is a plan view of an electric meter with a meter ring bound together with a takeup means utilizing another form of the fastener embodying the teachings of the present invention.
Figure 5:
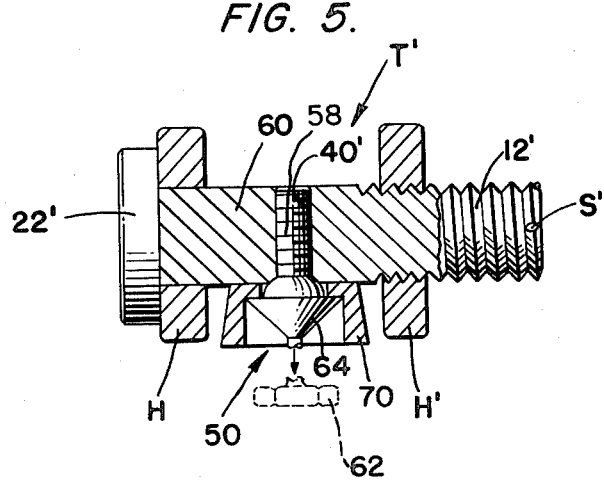
FIG. 5 is a view taken along line 5—5 of FIG. 4.

Another form of the device is shown in FIGS. 4 and 5, and is indicated by the reference indicator T'. The meter M is circumscribed by the annular collar C which has a pair of facially opposed ends E. The collar has a pair of hasps H and H' for drawing that collar about the meter. The hasp H has an unthreaded bore U defined therethrough, and the hasp H' has a threaded bore TB defined therethrough.

The ring draw T' includes a ring screw 10' having a threaded shank 12' on one end thereof and a head section 22' on the other end thereof. A trunk portion 60 is interposed between the threaded shank and the head portion. A seal ring hole S' is defined through the threaded portion to receive a seal ring.

An internally threaded bore 40' is defined in the trunk portion of the ring screw to be transverse of the longitudinal centerline of the trunk portion and receives the threaded stud 58 of the fastener 50. The fastener 50 in the FIG. 4 embodiment is identical to the fastener 50 of the FIG. 1 embodiment; however, the first-mentioned fastener is located between the hasps H and H' rather than in the head section of the ring screw. The fastener 50 is shown in FIG. 4 to be inserted at right angles to the tightening screw 10' between the hasps of the barrel-type ring C.

The screw 10' is threadably received in the bore TB to draw the head 22' against the hasp H and to thereby draw the hasps H and H' together to tighten the collar about the meter.

However, with the fastener 50 in place in the ring screw 22' between the hasps H and H', significant movement of the screw 22' in either the threading or unthreading direction is prevented by contact of the fastener 50 with either hasp H or hasp H'.

The fastener in FIG. 4 can include either a hard or a soft slip ring, and operates and functions in a manner similar with the slip ring shown in FIG. 1.

It is noted that present high security rings often include a tightening screw used to draw the ends of the ring about the meter, and a barrel-type lock is used to provide security. The device shown in FIGS. 4 and 5 thus can be used as a replacement for the barrel lock and tightening screw and thus combines the features of both.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A tamper-resistant device for use on a utility meter comprising:

a ring screw having an elongate threaded shank, a slotted tongue on one end of said shank, and a head on another end of said shank, said head having a bore defined therethrough, said bore being oriented transversely with respect to the longitudinal centerline of said shank;

a tamper-resistant fastener mounted in said bore, said fastener including a stud received within said bore, a stud engaging means engaged on said stud, a gripping means engaging portion connected to said stud engaging means for transmitting torque to said stud engaging means from a gripping means;

a frangible neck connecting said gripping means engaging portion to said stud engaging means, said frangible neck being adapted to fracture when a predetermined torque is applied to said gripping means engaging portion to separate said gripping means engaging portion from said stud engaging means; and a cylindrical slip ring for preventing a gripping instrument from applying a gripping force to said stud engaging means for turning said stud engaging means to remove the fastener, said slip ring surrounding said stud engaging means and slidably connected thereto to freely rotate about said stud engaging means when said gripping means engaging portion is separated from said stud engaging means.

2. The tamper-resistant device defined in claim 1 wherein said slip ring has locking means thereon engaging said stud engaging portion for preventing movement of said slip ring in a direction axially of said stud beyond a predetermined amount.

3. The tamper-resistant device defined in claim 2 wherein said slip ring is closely spaced with said stud engaging portion to prevent insertion of a disengaging device between said slip ring and said stud engaging portion.

4. The tamper-resistant device defined in claim 3 wherein said slip ring is cylindrical.

5. The tamper-resistant device defined in claim 4 wherein said stud engaging portion is frusto-conical in shape.

6. The tamper-resistant device defined in claim 1 wherein the utility meter has a meter collar surrounding same, said meter collar including a pair of spaced ends and a collar takeup means mounted near said collar ends, said takeup means including a pair of blocks mounted on said collar and having threaded bores defined therein for threadably receiving said ring screw to move said collar ends with respect to each other by rotating said ring screw, one of said blocks including a fastener accommodating chamber in which said ring screw head is located, said chamber having walls against which said fastener abuts when said ring screw is rotated in a threading or unthreading direction.

7. The tamper-resistant device defined in claim 6 further including slots defined in said ring screw tongue and said blocks and a seal ring inserted through said slots, said seal ring including a seal thereon.

8. The tamper-resistant device defined in claim 2 wherein said stud engaging means includes an axial boss connecting said stud and said stud engaging means.

9. The tamper-resistant device defined in claim 1 or 8 wherein said stud and said stud engaging means are unitary.

10. The tamper-resistant device defined in claim 1 or 6 wherein said ring screw head bore has a chamfered area defined therearound.

11. The tamper-resistant device defined in claim 1 wherein said tongue is planar and the longitudinal axis of said bore is co-planar with said tongue.

12. A tamper-resistant device for use on a utility meter comprising:

a ring screw having an elongate threaded shank on one end thereof, a head on another end thereof and a trunk portion interposed between said threaded shank and said head portion, said trunk portion having a thread bore defined therein, said bore being oriented tansversely with respect to the longitudinal centerline of said trunk;

a tamper-resistant fastener mounted in said bore, said fastener including a stud received within said bore, a stud engaging means engaged on said stud, a gripping means engaging portion connected to said stud engaging means for transmitting torque to said stud engaging means from a gripping means;

a frangible neck connecting said gripping means engaging portion to said stud engaging means, said frangible neck being adapted to fracture when a predetermined torque is applied to said gripping means engaging portion to separate said gripping means engaging portion from said stud engaging means; and a cylindrical slip ring for preventing a gripping instrument from applying a gripping force to said stud engaging means for turning said stud engaging means to remove the fastener, said slip ring surrounding said stud engaging means and slidably connected thereto to freely rotate about said stud engaging means when said gripping means engaging portion is seaprated from said stud engaging means.

13. The tamper-resistant device defined in claims 1 or 12 wherein said slip ring is formed of a soft material.

14. The tamper-resistant device of claim 12 including a collar surrounding a utility meter and further including a pair of hasps on said collar, said tamper-resistant fastener being located between said hasps.

15. The tamper-resistant device of claim 14 further including a threaded bore defined through one of said hasps with said ring screw threaded shank being threadably received in said hasp threaded bore to connect said hasps together via said ring screw.

* * * * *